United States Patent
Bennett et al.

(10) Patent No.: US 7,020,700 B1
(45) Date of Patent: *Mar. 28, 2006

(54) CLIENT SIDE SOCKS SERVER FOR AN INTERNET CLIENT

(75) Inventors: Craig Alan Bennett, Round Rock, TX (US); Christian Lita, Austin, TX (US); James Lyle Peterson, Austin, TX (US); Joseph Raymond Thompson, Round Rock, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,286

(22) Filed: Feb. 28, 1997

(51) Int. Cl.
G06F 15/173 (2006.01)

(52) U.S. Cl. ........................ 709/224; 709/223
(58) Field of Classification Search ............ 380/49; 395/200.76, 36, 34, 49, 53, 61, 187.01; 345/329; 370/392, 356; 358/400; 379/88.22; 455/4.2; 709/245, 228, 227, 217, 226, 229, 233, 203, 709/236; 713/201
See application file for complete search history.

(56) References Cited

U.S. PATENT DOCUMENTS

| | | | |
|---|---|---|---|
| 5,309,437 A | | 5/1994 | Perlman et al. |
| 5,410,543 A | | 4/1995 | Seitz et al. |
| 5,673,322 A | * | 9/1997 | Pepe et al. ............ 380/49 |
| 5,680,461 A | * | 10/1997 | McManis ............ 713/162 |

(Continued)

OTHER PUBLICATIONS

Beyer, HOw to share an Internet connection for little or no cost, 1996.*
Viktora et al, WinPRoxy 1.4, 1996.*
Viktora et al, WinProxy 1.4 www.winproxy.net/man14us.html, 1996.*
Beyer. How to share an Internet connection for little or no cost. wwwos2ezine.com/vln14.socks.htm, 1996.*
Beyer, How to share an Internet connection for little or no cost, www,os2ezine.com/vln14/socks.htm, 1996.*
Viktora et al, WinProxy 1.4, www.neckar–abl.de/winproxy/man14us.html, 1996.*
Web Explorer View Window API. http://beskid.perytnet.pl/produkty/software/ibm/apirefm.html, Jan. 1997.*
Mark Grenn. Firewalling & Proxy Server HOW TO. http://theochem.uni–duesseldorf.de/docu/linux–howto/firewall–HOWTO.html, Nov. 8, 1996.*
M. Leech et al, RFC1928, Mar. 1996.*
SOCKS5 Web Page Information; www.socks.nec.com, 1996.
Socks and Socks Related Items, ftp.nec.com., 1996.

*Primary Examiner*—Jack Harvey
*Assistant Examiner*—Thong Vu
(74) *Attorney, Agent, or Firm*—Duke W. Yee; Jeffrey S. LaBaw; Michael R. Nichols (57) ABSTRACT

An Internet client is provided with a SOCKS server. The client comprises a processor having an operating system, and a suite of one or more Internet tools. The SOCKS proxy server includes means for intercepting and servicing connection requests from the Internet tools. Preferably, the proxy server has a predetermined Internet Protocol address, preferably the loopback address. If the loopback address is not available on the protocol stack, a redirecting mechanism is used to redirect connection requests associated with stale IP addresses to a current IP address. The SOCKS server includes a filtering mechanism for filtering connection requests to particular servers, and a monitoring mechanism for monitoring network IP activity.

25 Claims, 6 Drawing Sheets

U.S. PATENT DOCUMENTS

| | | | | |
|---|---|---|---|---|
| 5,708,780 A | * | 1/1998 | Levergood et al. | 709/227 |
| 5,727,159 A | * | 3/1998 | Kikinis | 395/200.76 |
| 5,729,689 A | * | 3/1998 | Allard et al. | 709/228 |
| 5,740,361 A | * | 4/1998 | Brown | 713/201 |
| 5,754,774 A | * | 5/1998 | Bittinger et al. | 709/203 |
| 5,802,304 A | * | 9/1998 | Stone | 709/227 |
| 5,815,664 A | * | 9/1998 | Asano | 709/227 |
| 5,822,539 A | * | 10/1998 | Van Hoff | 709/236 |
| 5,826,025 A | * | 10/1998 | Gramloch | 709/217 |
| 5,838,910 A | * | 11/1998 | Domenikos et al. | 709/203 |
| 5,864,666 A | * | 1/1999 | Shrader | 395/187.01 |
| 5,892,903 A | * | 4/1999 | Klaus | 713/201 |
| 5,905,872 A | * | 5/1999 | DeSimone et al. | 709/245 |
| 5,913,041 A | * | 6/1999 | Ramanathan et al. | 709/223 |
| 5,918,019 A | * | 6/1999 | Valencia | 709/227 |
| 5,933,604 A | * | 8/1999 | Inakoshi | 709/226 |
| 5,941,988 A | * | 8/1999 | Bhagwat et al. | 713/201 |
| 5,961,601 A | * | 10/1999 | Iyengar | 709/229 |
| 6,003,084 A | * | 12/1999 | Green et al. | 709/227 |
| 6,078,583 A | * | 6/2000 | Takahara et al. | 370/356 |
| 6,078,943 A | * | 6/2000 | Yu | 709/105 |
| 6,104,716 A | * | 8/2000 | Crichton et al. | 370/401 |
| 6,115,745 A | * | 9/2000 | Bertis et al. | 709/227 |

\* cited by examiner

CLIENT SIDE SOCKS SERVER FOR AN INTERNET CLIENT

TECHNICAL FIELD

The present invention relates generally to computer network communications and more particularly to managing connection requests in a dialup computer network environment.

BACKGROUND OF THE INVENTION

There has been great interest in providing Internet access at minimal economic cost. While most computers now are pre-configured for Internet access, a significant percentage of households still do not have a personal computer. Thus, it has now been proposed to provide a data processing system that, much like a VCR, may be connected to a television set and used in lieu of a personal computer to provide Web access through a conventional remote control device associated with the system unit. Such a system enables the television to become, in effect, a "Web" appliance. The viewer can rapidly switch between conventional television and Internet access using the remote control unit.

All of the conventional "Internet" access tools and navigational functions are preferably "built-in" to the system and thus hidden to the user. One such tool is a browser, which is used to provide the user access to the Internet's multimedia information retrieval system, commonly referred to as the World Wide Web. Access to the Web is provided using the Hypertext Transfer Protocol (HTTP). Typically, a browser issues HTTP GET requests to servers in the World Wide Web by passing packets over the network and receiving Web documents. Another Internet tool is electronic mail, which uses the Simple Mail Transport Protocol (SMTP). File transfers are effected using another protocol, the File Transfer Protocol (FTP).

It would be highly desirable to intercept or monitor client side IP activity in a Web appliance. Such operation, for example, would facilitate filtering of connection requests regardless of the type of protocol associated with a particular request. Monitoring client side IP activity would also be useful to enable a service provider to collect information about the user's browsing preferences. Such a mechanism would also be useful in serving as a "firewall" to prevent the Internet client from accessing restricted machines on the network.

The present invention addresses this need in the art.

BRIEF SUMMARY OF THE INVENTION

It is thus a primary goal of the present invention to efficiently manage Internet Protocol (IP) service requests in an Internet client, such as a Web appliance.

It is a more particular object of the invention to intercept and process connection requests using a TCP/IP transport mechanism, e.g., a proxy protocol such as SOCKS, supported on the same machine on which other Internet tools are supported.

It is a specific object of the invention to provide a SOCKS server on a client machine to intercept or monitor client IP network activity and thus facilitate the providing of client side services such as network monitoring, connection request filtering, enhanced security, and the like.

It is a more particular object to implement a client side SOCKS server for intercepting host name resolution requests and for monitoring network link activity.

It is still another object of the invention to provide a Web appliance with enhanced operating capability through use of a client side proxy server, for example, a SOCKS server.

Still another more general object is to implement a client side proxy server on a client by binding a suite of Internet tools to a SOCKS proxy server running on the Internet client. Internet Protocol (IP) connection requests are then serviced locally.

Yet another more general object of the invention is to use a SOCKS proxy server to provide services on behalf of an Internet client.

These and other objects of the invention are provided in a method of managing Internet Protocol (IP) connections from an Internet client. According to the method, a SOCKS proxy server is supported on the client. One or more Internet tools on the client are then configured to send connection requests for service to the proxy server at an Internet Protocol address, preferably the loopback address. According to the method, the proxy server attempts to service the request locally on behalf of the Internet tool. The proxy server is also useful in monitoring network activity, such as bit rate, the number of connect(s) to one or more particular servers on the network, hostname to IP address resolution(s), and the like. It may also be particularly useful in filtering connection requests to particular IP addresses.

In accordance with the invention, a client computer, for example, a Web appliance, is connectable to the Internet and comprises a processor having an operating system, a suite of one or more Internet tools, and a SOCKS proxy server. The proxy server includes means for intercepting and servicing connection requests from the Internet tools. Preferably, the proxy server has a predetermined Internet Protocol address, preferably the loopback address. If the loopback address is not available on the protocol stack, a redirecting mechanism is used to redirect connection requests associated with stale IP addresses to a current IP address.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
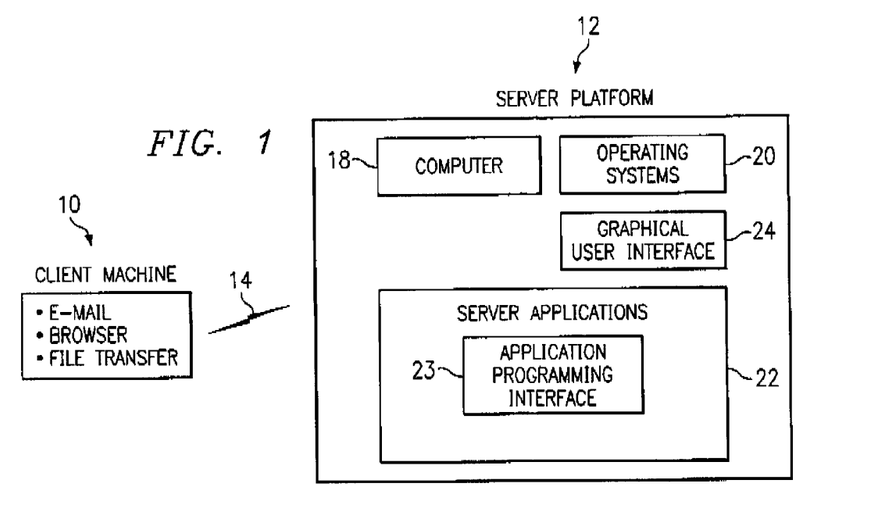
FIG. 1 is a representative system in which the present invention is implemented.

A representative system in which the present invention is implemented is illustrated in FIG. 1. An Internet client machine 10 is connected to a server platform 12 via a communication channel 14. For illustrative purposes, channel 14 is the Internet, an Intranet or other known connection. In the case of the Internet, server platform 12 is one of a plurality of servers which are accessible by clients, one of which is illustrated by machine 10, via a dialup computer network. The dialup computer network (or, more specifically, the Internet service provider or ISP) assigns an Internet Protocol (IP) each time the client dials up to the network. The client machine typically includes a suite of known Internet tools 16 to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

By way of example only, a client machine is a personal computer such as a desktop of notebook computer, e.g., an IBM® or IBM-compatible machine running under the OS/2® operating system, an IBM ThinkPad® machine, or some other Intel x86 or Pentium®-based computer running Windows 3.1 or greater operating system. A representative server platform 12 comprises an IBM RISC System/6000 computer 18 (a reduced instruction set of so-called RISC-based workstation) running the AIX (Advanced Interactive Executive Version 4.1 and above) Operating System 20 and a server program 22. The platform 12 also includes a graphical user interface (GUI) 24 for management and administration. It may also include an application programming interface (API). Connection requests (such as HTTP GET requests) are transferred from the client machine to the server platform in a known manner to obtain hypertext documents or objects. The various models of the RISC-based computers are described in many publications of the IBM Corporation, for example, RISC System/6000, 7013 and 7016 POWERstation and POWERserver Hardware Technical Reference, Order No. SA23-2644-00. AIX OS is described in AIX Operating System Technical Reference, published by IBM Corporation, First Edition (November 1985), and other publications. While the above platform is useful, any other suitable hardware/operating system/server combinations may be used.

Figure 2A:
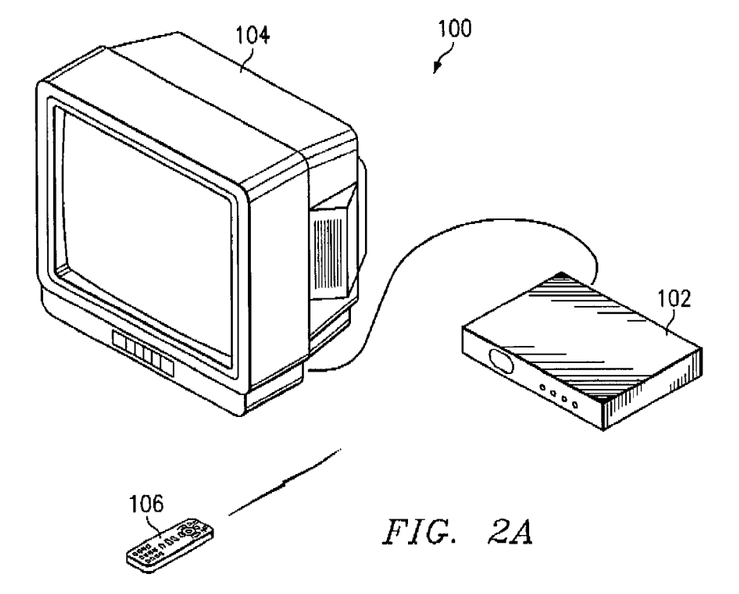
FIG. 2A is pictorial representation of a data processing system unit connected to a conventional television set to form a "Web" appliance.

Alternatively, the Internet client may be a data processing system or a so-called "Web appliance" such as illustrated in FIGS. 2A–2D and 3. FIG. 2A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, which is conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device (such as a mouse, glidepoint, trackball or the like) in conventional personal computers, including the ability to move a cursor on a display and select items.

Figure 2B:
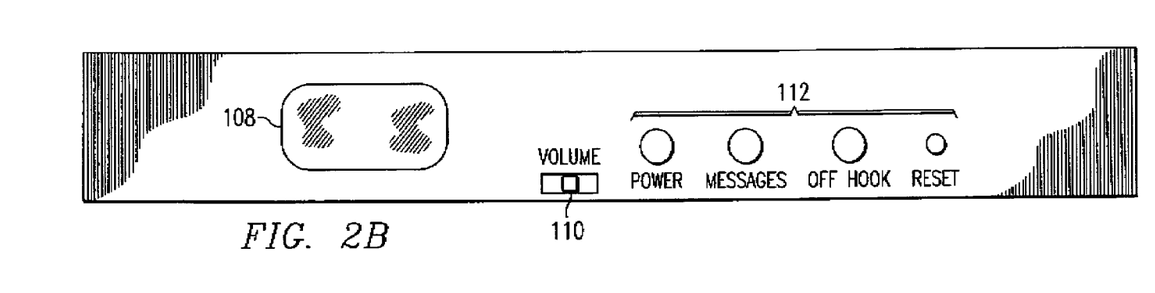
FIG. 2B is a pictorial representation of a front panel of the data processing system unit.

FIG. 2B is a pictorial representation of the front panel of data processing unit 102. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104 and other infrared remote controlled devices. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 2C:
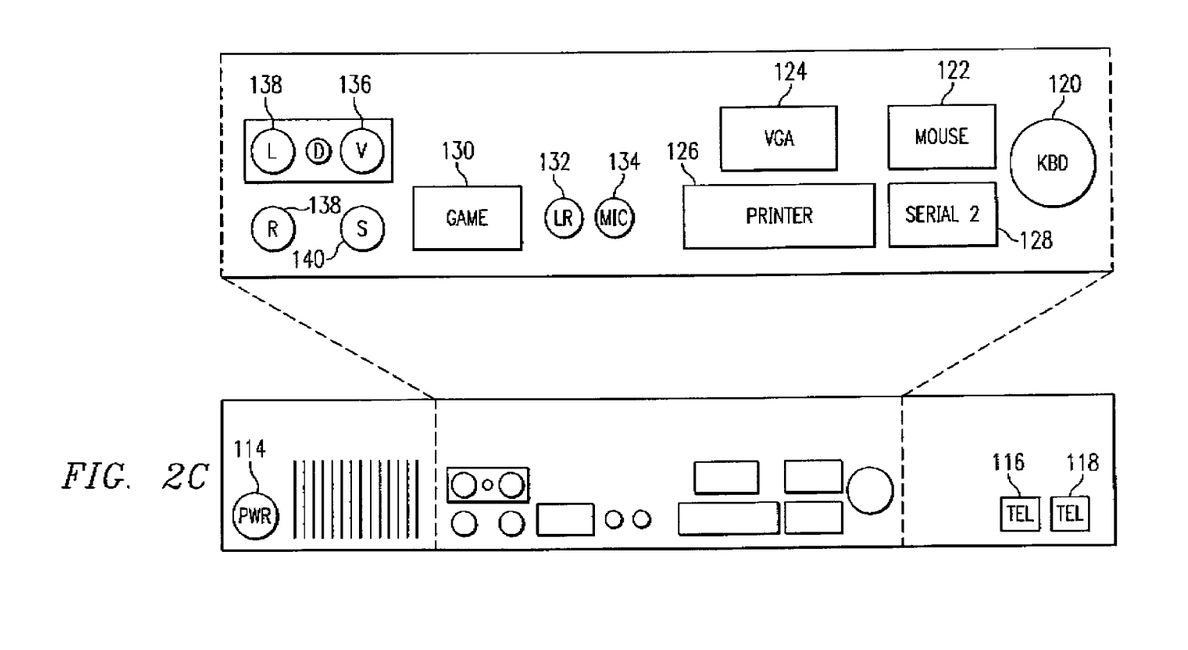
FIG. 2C is a pictorial representation of a rear panel of the data processing system unit.

FIG. 2C is a pictorial representation of the rear panel of data processing unit 102. A three wire (ground included) insulated power cord 114 passes through the rear panel. Standard telephone jacks 116 and 118 on the rear panel provide an input to a modem from the phone line and an output to a handset (not shown). The real panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel ¾ modulator (not shown) may be connected in-line with the antenna connection.

Figure 2D:
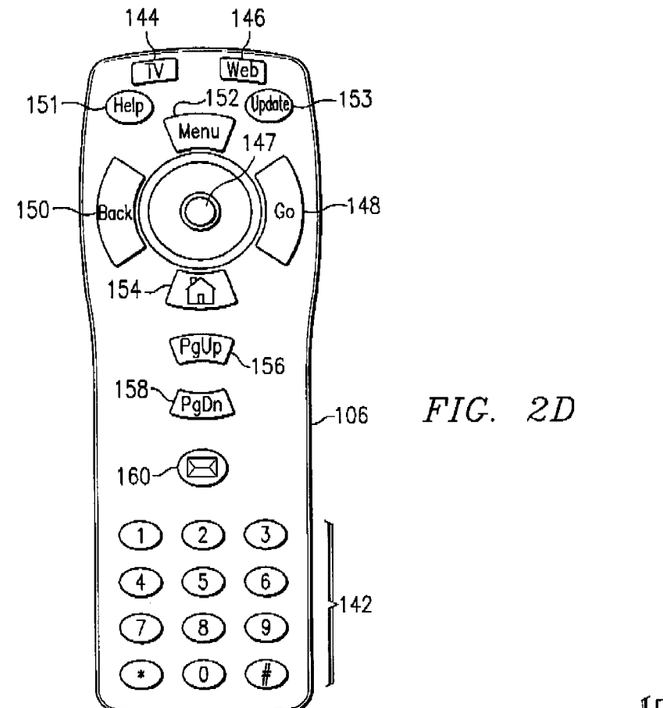
FIG. 2D is a pictorial representation of a remote control unit associated with the data processing system unit.

FIG. 2D is a pictorial representation of remote control unit 106. Similar to a standard telephone keypad, remote control unit 106 includes buttons 142 for Arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. Pressing "Web" button 146 will cause data processing unit 102 to initiate modem dial-up of the user's Internet service provider and display the start-up screen for an Internet browser.

A pointing device 147, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Help" button 151 causes context-sensitive help to be displayed or otherwise provided. "Menu" button 152 causes a context-sensitive menu of options to be displayed, and "Update" button 153 will update the options displayed based on the user's input, while home button 154 allows the user to return to a default display of options. "PgUp" and "PgDn" buttons 156 and 158 allows the user to change the context of the display in display-sized blocks rather than by scrolling. The message button 160 allows the user to retrieve messages.

In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 3:
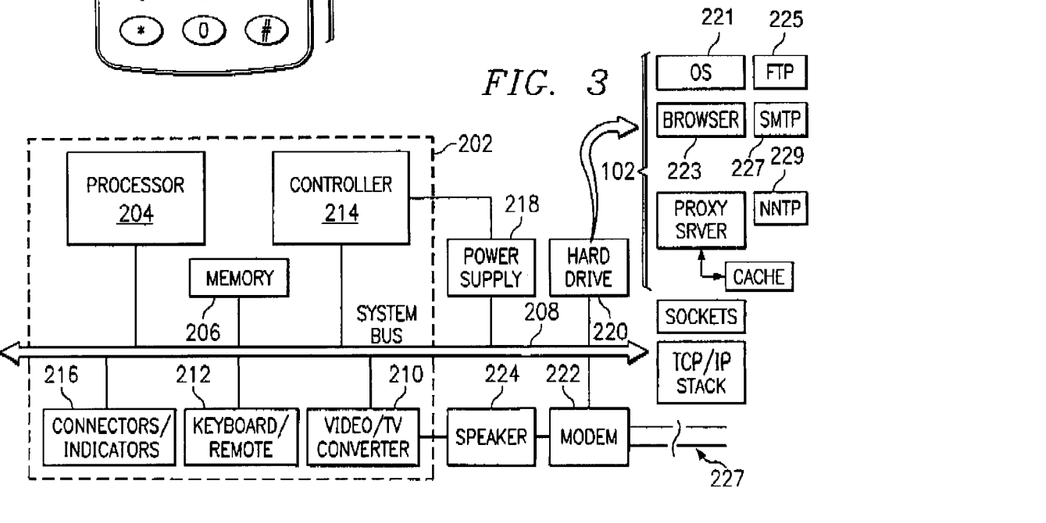
FIG. 3 is a block diagram of the major components of the data processing system unit.

Referring now to FIG. 3, a block diagram for the major components of data processing unit 102 is portrayed. As with conventional personal computers, data processing unit 102 includes a motherboard 202 containing a processor 204 and memory 206 connected to system bus 280. Processor 205 is preferably at least a 486 class processor operating at or above 100 MHz. Memory 206 may include cache memory and/or video RAM. Processor 205, memory 206, and system bus 208 operate in the same manner as corresponding components in a conventional data processing system.

Video/TV converter 210, located on motherboard 202 and connected to system bus 208, generates computer video signals for computer monitors, a composite television signal, and an S-Video signal. The functionality of Video/TV converter 210 may be achieved through a Trident TVG9685 video chip in conjunction with an Analog Devices AD722 converter chip. Video/TV converter 210 may require loading of special operating system device drivers.

Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the function provided by an infrared keyboard.

Connectors/indicators 216 on motherboard 202 provide some of the connections and indicators on data processing unit 102 described above. Other connections are associated with and found on other components. For example, telephone jacks 116 and 118 are located on modem 222. The power indicator within connectors/indicators 216 is controlled by controller 214.

External to motherboard 202 in the depicted example are power supply 218, hard drive 220, modem 222 and speaker 224. Power supply 218 is a conventional power supply except that it receives a control signal from controller 214 which effects shut down of all power to motherboard 202, hard drive 220 and modem 222. In some recovery situations, removing power and rebooting is the only guaranteed method of resetting all of these devices to a known state. Thus, power supply 218, in response to a signal from controller 214, is capable of powering down and restarting data processing unit 102.

Controller 214 is preferably one or more of the 805x family controllers. Controller 214 receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use. As part of the failure recovery system, controller 214 specifies the boot sector selection during any power off-on cycle.

Hard drive 220 contains operating system and applications software for data processing unit 102. Such software preferably includes IBM DOS 7.0, a product of International Business Machines Corporation in Armonk, N.Y.; an operating system 221 such as Windows 3.1 (or higher), a product of Microsoft Corporation in Redmond, Wash.; and a browser 223 such as Netscape Navigator (Version 1.0 or higher), a product of Netscape Communications Corporation in Mountain View, Calif. The suite of Internet tools resident on the hard drive 220 also preferably include an FTP mechanism 225 to facilitate file transfers from Internet FTP sites, an SMTP mechanism 227 to provide electronic mail capability, an NNTP mechanism 229 to provide news group (i.e. bulletin board) service, and other known Internet protocol mechanisms. Of course, the software identified above is merely representative, as other known programs may be used in the alternative or by way of addition. Also, minor modifications of these software packages may be desirable to optimize performance of data processing unit 102.

Modem 222 may be any suitable modem used in conventional data processing systems, but is preferably a 33.6 kbps modem supporting the V.42bis, V.34, V.17 Fax, MNP 1–5, and AT command sets. To maintain the slim height of data processing system 102, modem 222 is preferably inserted into a slot mounted sideways on motherboard 202. Modem 222 is connected to a physical communication link 227, which, in turn, in connected or connectable to the Internet and, in particular, a dialup network having a service provider.

Those skilled in the art will recognize that the components depicted in FIGS. 2A–2D and 3 and described above may be varied for specific applications or embodiments. Such variations in which the present invention may be implemented are considered to be within the spirit and scope of the present invention.

Figure 4:
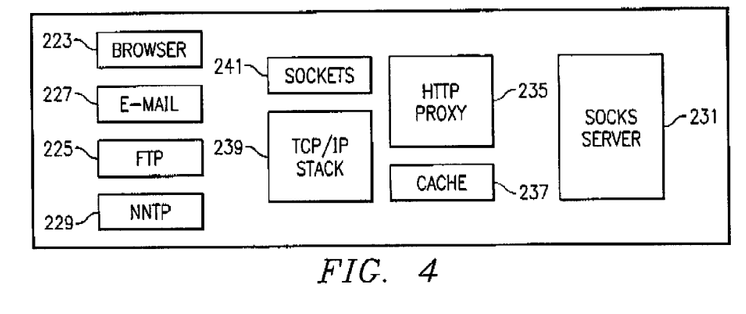
FIG. 4 is a block diagram of a client side SOCKS proxy server implemented in the Web appliance of FIG. 2A.

According to the invention, and with reference to FIG. 4, the client machine includes a SOCKS server 231 to managing communications from Internet applications supported on the client machine. The SOCKS server is protocol-independent and may be used to intercept or monitor client side IP activity in the Web appliance, and to filter connection requests. As also seen in FIG. 4, the client machine may also include an HTTP proxy server 235. Preferably, HTTP proxy server is implemented in software and includes a cache 237 associated therewith. The HTTP proxy server 235 intercepts HTTP requests, for example, HTTP GET requests, and services them on behalf of the browser as described in copending application Serial No. xx/yyy,zzz, which is assigned to the assignee of this application. This operation is effected without the browser being aware that the service is being handled locally. The HTTP proxy server is optional. The client machine also includes a protocol stack 239 (e.g., a TCP/IP protocol stack) and a sockets mechanism 241, which are used to support communications in a known manner.

SOCKS is a known low level networking proxy mechanism. It enables a machine on one side of a connection to fully access a machine on the other side of the connection without requiring direct IP reach ability. Connection requests are redirected to a SOCKS server, which authenticates and authorizes the requests, establishes a proxy connection and passes data back and forth on the connection. Typically, SOCKS is used as a network firewall to thereby enable a machine on one side of the firewall to gain full access to the Internet while preventing unauthorized access from the Internet to the machine. There are two major versions of SOCKS, Socks4 and Socks5, either of which may be used in the implementation of the present invention. The main difference between the two known implementations is that Socks4 does not support encryption. Further details regarding these implementations may be obtained from Open Internet Standards RFC 1928 (relating to Authenticated Firewall Traversal), RFC 1929 (Username/Password Authentication For SOCKS V5) and RFC 1961 (GSS-API Authentication For SOCKS V5), all of which are incorporated herein by reference. A set of client SOCKS tools for both UNIX and Windows is available on the Internet at www.socks.nec.com or from the ftp site ftp.nec.com.

Figure 5A:
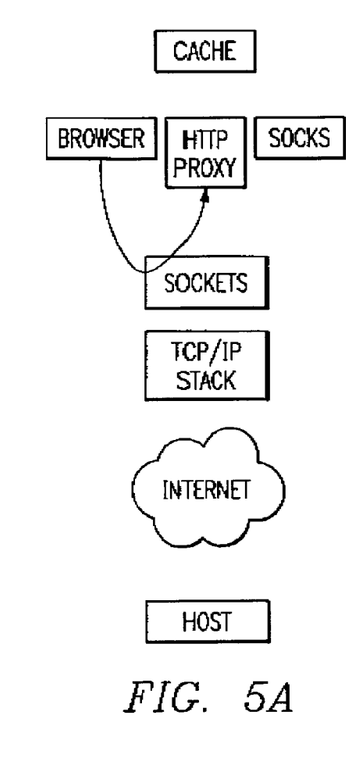
FIGS. 5A–5D are process flow diagrams showing how the SOCKS proxy server may be used according to the present invention.
Figure 5B:
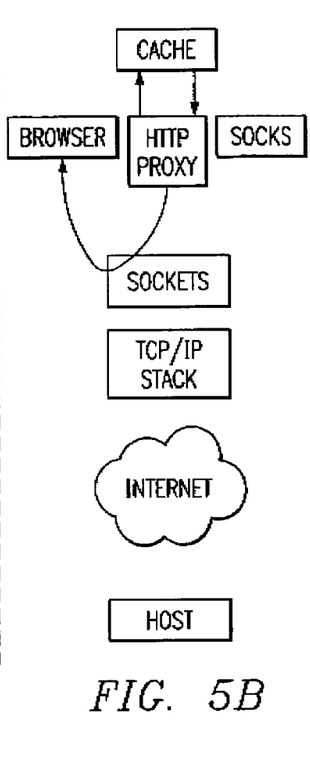

Referring now to FIGS. 5A–5D, process flow diagrams are shown illustrating how the SOCKS server 231 is used according to the present invention in the context of a connection request involving the HTTP protocol. In this example, it is assumed that the HTTP proxy server 235 is also present in the client along with its associated cache 237. In FIG. 5A, the user has clicked on a link and requested a hypertext document from a Web site. Because the HTML document may be present already on the client, the browser formulates an HTTP request and sends it to the HTTP proxy server 235. The HTTP proxy server 235 may perform a test to determine whether the URL requested is restricted. If the URL is not requested (or if no such test is performed), the proxy server 235 determines whether it has the document in the cache and, if so, retrieves it. This is illustrated in FIG. 5B.

Figure 5C:
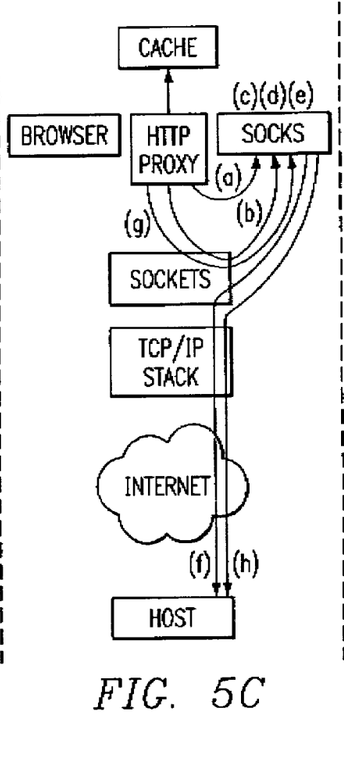

Now, assume that the HTTP proxy could not obtain the document locally. It is thus necessary to go out on the network and obtain the document from the host (namely, the Web site). This is illustrated in the process flow diagram of FIG. 5C. At step (a), the HTTP proxy connects to the SOCKS server. The HTTP proxy then sends a connection request for the host to the SOCKS server at step (b). The SOCKS server then resolves the host server name to an IP address (in step (c)) and then, optionally, checks (in step (d)) to determine whether the IP address is restricted. If the IP address is restricted, the SOCKS server rejects the connection request and closes the connection to the HTTP proxy. This is illustrated as step (e). If the IP address is not restricted, then the SOCKS server connects to the host over the network at step (f). At step (g), the HTTP proxy sends the HTTP GET request to the SOCKS server. At step (h), the SOCKS server forwards the HTTP GET request to the host server.

Figure 5D:
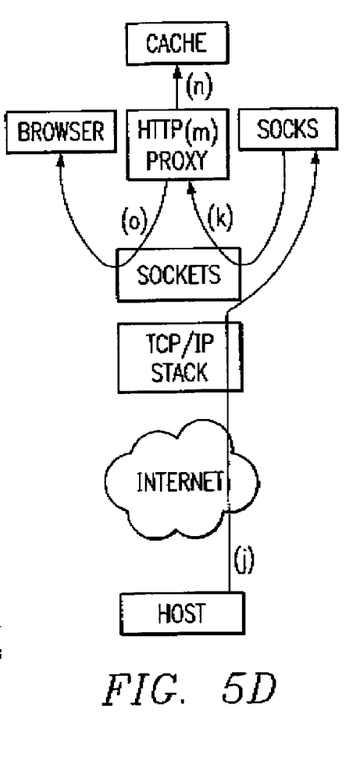

Referring now to FIG. 5D, the host then sends the HTTP response to the SOCKS server at step (j). At step (k), the SOCKS server forwards the HTTP response to the HTTP proxy. The HTTP proxy may then process the information, e.g., to modify font sizes, add links, modify preformatted text, and the like. This is step (m), and is described in detail in copending application Serial No. xx/yyy,zzz, which is assigned to the assignee of this application. At step (n), the document as processed is saved in the cache. The HTTP proxy then forwards the processed HTTP response to the browser at step (o) and the routine terminates.

It should be appreciated that the process flow diagrams of FIGS. 5A–5D relate to handling of connection requests involving the HTTP protocol. The SOCKS server provides a similar operation with respect to connection requests involving the other Internet protocols (e.g., FTP, SMTP and the like), although in those cases the HTTP proxy server is not used.

Preferably, the SOCKS server starts up when the Web appliance is booted-up. Connectivity between the SOCKS server and the browser is preferably achieved by configuring the browser and the other Internet tools to pass the HTTP and other connection requests to the server. One mechanism for doing this is to have the browser (or other Internet tool) open a socket and bind to the so-called "loopback" address. The loopback address is a well-known address, and is typically associated with Internet Protocol address 127.0.0.1. When the proxy server is a SOCKS server, a port number (e.g. 1080) is assigned. It is typically configured by setting the "http proxy" variable in the netscape.ini configuration file (in a Windows-based operating system environment) to "127.0.0.1" and the "http, port" variable to "1080".

The protocol stack 239, however, may not support the loopback address. In this circumstance, a mechanism may be provided in the sockets layer to redirect connection requests associated with stale IP addresses to a current or valid IP address. By way of brief background, a conventional sockets mechanism is first described below in the flowchart of FIG. 6.

Figure 6:
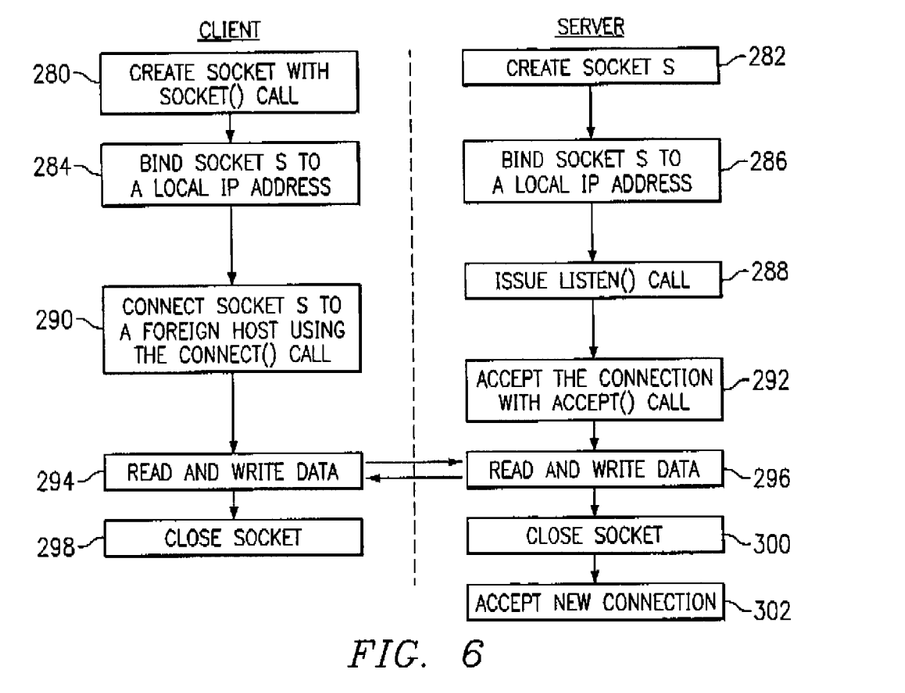
FIG. 6 is a flowchart of a conventional sockets mechanism between a client and a server.

FIG. 6 is a flowchart illustrating a known connection-oriented socket mechanism used by the SOCKS server 231. The various functions of the "client" are located on the left portion of the chart, and the functions of the "server" are located on the right portion. In the context of the present invention, the "client" is the browser and the "server" is the SOCKS server, both of which are supported on the client machine as discussed above. The following describes the mechanism used by the browser to obtain some Internet content, e.g., a Web page, although it will be appreciated that a similar operation may be implemented for some other Internet service. At step 280, the client creates a socket "s"

with a socket( ) call. The server also creates a socket "s" with the socket( ) call. These steps indicate that the client and server intend to open up a connection and thus certain data structures must be set up. At step 284 and at step 286, the client and server issue a bind call to bind the socket "s" to a local IP address. In the context of the present invention, the local address may be either the loopback address or a name, e.g., LOCALHOST, if the loopback address is unavailable on the protocol stack 239. At step 288, the server issues a listen( ) call, indicating that it is willing to accept calls. At step 290, it is assumed that the client issues a connect( ) call that seeks to connect socket "s" to a "foreign" host, which as noted above is preferably the client side SOCKS server. The connect call specifies the destination as the local IP address.

At step 292, the server accepts the connection and receives a second socket "ns" by issuing an accept( ) call. At this point the particular session is opened and the connection request may be carried out. For the server, socket s remains available to accept new connections and socket ns is dedicated to the client. At steps 294 and 296, the client reads and writes data on socket s and the server reads and writes data on socket ns, until all data has been exchanged. The read and write operations are carried out using send( ) and receive( ) calls. At step 298, the client closes socket s and ends the session with a soclose( ) call. The server closes socket ns with the soclose( ) call at step 300. The server may then accept another connection from a client or close the original socket s with the soclose( ) call at step 302.

In the typical Internet service environment, the Web appliance is connected to the Internet via a dialup computer network. The network and, in particular, the Internet service provider (or ISP), may assign an Internet Protocol (IP) address each time the Internet client dials up to the network. During a particular session, however, the connection to the dialup network may be broken, e.g., because the client is inactive for a period of time or if the physical connection is disrupted for any reason. In the dialup environment, the IP address assigned by the ISP can change every time a new modem connection is established. When this IP address changes, the browser has to reconfigure itself if the connection to the local proxy server supported in the client is to be maintained.

Figure 7:
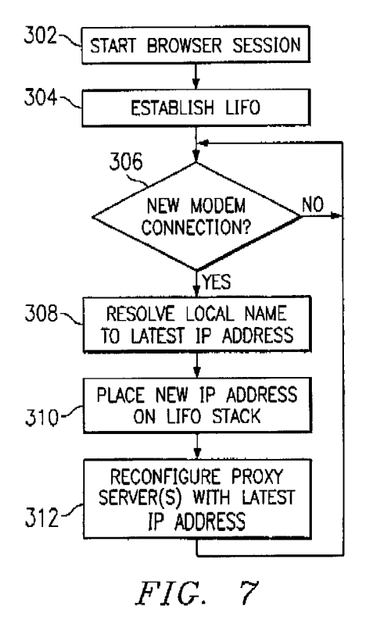
FIG. 7 is a flowchart for generating a Last In, First Out (LIFO) stack in which IP addresses are maintained.

The proxy server redirects connection requests from stale IP addresses. This is accomplished by first generating a list of Internet Protocol (IP) addresses that are assigned, usually during a particular browsing session. FIG. 7 is a flowchart illustrating this process. The routine begins at step 302 when the browser session is initiated. At step 304, the routine initializes or otherwise creates a Last In, First Out (LIFO) stack. Initially, this stack is empty. A test 306 is made to determine whether there is a new modem connection, i.e. whether a new IP address has been assigned by the network service provider. As discussed above, a new IP address may be assigned each time a modem connection to the dialup computer network is established or re-established during a particular session. If the outcome of the test at step 306 is negative, the routine cycles back. If, however, the outcome of the test at step 306 is positive, a new IP address has been assigned. The routine then continues at step 308 and resolves the LOCALNAME to a latest IP address. At step 310, the routine continues and places the new IP address on the LIFO stack (as the Last In entry). At step 312, the routine reconfigures, with the latest IP address, the SOCKS server 231 and (if used) the proxy server 235. The routine then cycles back to before step 306.

Figure 8:
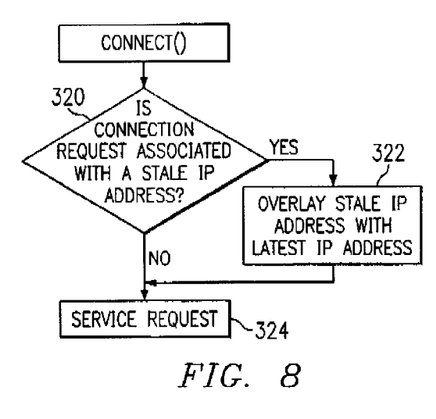
FIG. 8 is a connect( ) routine that is used to manage connection requests.

As new IP addresses are assigned during a session, they are accumulated on the LIFO stack, which the current IP address (i.e. the IP address for the then-pending connection) being the Last In entry. All other IP addresses on the stack are then considered to be "stale" since they no longer represent true IP addresses. The browser, however, is not "aware" of the changes to the IP addresses. It continues to formulate connection requests using the original IP address (e.g., LOCALNAME) that was assigned at the beginning of the browsing session (when the modem first connected to the Internet). Thus, the above scheme provides an enhancement to the sockets mechanism of FIG. 6 to enable redirection of connection requests associated with stale IP addresses transparently to the browser and other Internet protocol mechanisms supported on the client. This operation is shown in the flowchart of FIG. 8.

In particular, the routine is run for each connect( ) request. This is step 290 in FIG. 6. A test is first made at step 320 to determine whether the connection request is associated with a stale IP address. If the outcome of the test at step 320 is positive, the routine branches to step 322 to overlay the stale IP address with the latest IP address. The latest IP address will be the Last In entry in the LIFO stack in the preferred embodiment, although as noted above other suitable data structures may be used in place of this stack. After step 322, or if the outcome of the test at step 320 is negative, the routine continues and services the request at step 324.

The SOCKS proxy server provides significant advantages. It is useful in monitoring one or more types of network activity. Thus, for example, the SOCKS server is used to monitor bit rate or throughput over the network connection. In this example, the server functions as a simple link activity monitor. The server is also useful for monitoring how many "connect(s)" are made to which server(s) on the network or how many bytes are downloaded and from which server(s). Thus, the server may keep a history log reflecting that x bytes were downloaded from server A, y bytes were downloaded from server B, and so on, during a particular session. The bit and byte information may be monitored simply to provide some control signal, e.g., a signal that is used to blink a light on the monitor to show that network (namely, downloading) activity is taking place. The SOCKS server may monitor and store hostname to IP address resolution(s), so that network activity may be avoided.

The SOCKS server is also useful in filtering connection requests. In particular, a list of IP addresses or hostnames can be entered into the system using the remote control device. This list may be a restricted set of hostnames that support objectionable content. The server monitors connection requests and compares a request with the restricted list. If there is a match, the server returns a message indicating that the connection request cannot be serviced.

Alternatively, the proxy server could be used merely to monitor the user's browsing history and/or patterns for the purpose of collecting such use and/or content-oriented data as may be desired. The service provider could thus collect demographic statistics (in the user's clickstream) that may be useful for targeting advertising and the like. Of course, the particular usage of the proxy server is quite varied, with the above examples being merely representative. In general, the SOCKS server is useful as a means of offloading one or more sockets API level functions from the sockets mechanism.

One of the preferred implementations of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Internet client" should be broadly construed to mean any computer or component thereof directly or indirectly connected or connectable in any known or later-developed manner to a computer network, such as the Internet. The term "Internet server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by Letters Patent is set forth in the following claims:

What is claimed is:

1. A method of managing connection requests from an Internet application supported on a client, the client connectable to a server via a computer network, the method comprising the steps of:

supporting a SOCKS server on the client;

configuring the application to send a connection request to the SOCKS server; and having the SOCKS server service the connection request locally by creating a dial-up connection between the client and the computer network, establishing a network address for the client, sending data from the application to the server, receiving information from the at least one server sent to the network address and providing the information from the server to the application.

2. The method as described in claim 1 wherein the Internet application is a browser.

3. The method as described in claim 1 wherein the Internet application is file transfer.

4. The method as described in claim 1 wherein the Internet application is electronic mail.

5. The method as described in claim 1 wherein the Internet application is news group messaging.

6. The method as described in claim 1 wherein the step of configuring the application includes the step of establishing a predetermined local address and port number for the SOCKS server.

7. The method as described in claim 1 wherein the predetermined local address is a loopback address.

8. The method as described in claim 1 wherein if the connection request is associated with a stale IP address, the stale IP address is mapped to a current IP address.

9. The method as described in claim 1 wherein the client is a Web appliance.

10. The method as described in claim 1 further including the step of having the SOCKS server monitor network activity.

11. The method as described in claim 1 further including the step of having the SOCKS server filter information obtained in response to the connection request.

12. A computer program product for use in managing connection requests from an Internet application supported on a client machine connectable to a server via a computer network, the computer program product comprising:

a computer-readable storage medium; and program data encoded in the computer-readable storage medium, wherein the program data comprises:

a SOCKS proxy server located on the client machine;

means for configuring the application to send a connection request to the SOCKS proxy server at an Internet Protocol address; and means for servicing the connection request via the SOCKS server by creating a dial-up connection between the client and the computer network, establishing an network address for the client, sending data from the application to the server, receiving information from the server sent to the network address and providing the information to the application.

13. The computer program product as described in claim 12 wherein the means for servicing is protocol-independent.

14. The computer program product as described in claim 12 wherein the means for servicing transmits the connection request to one of the servers.

15. The computer program product as described in claim 12 wherein the Internet Protocol address is a loopback address.

16. A client computer connectable to the Internet, comprising:

a processor having an operating system;

a suite of Internet applications run by the operating system; and a SOCKS proxy server for intercepting and servicing connection requests on behalf of the Internet applications, the SOCKS proxy server servicing the connection requests by creating a dial-up connection between the client and the computer network, establishing an network address for the client, sending data from the application to the server, receiving information from the server sent to the network address and providing the information from the server to the application.

17. The client computer as described in claim 16 wherein the SOCKS proxy server has a predetermined Internet Protocol address.

18. The client computer as described in claim 17 wherein the predetermined Internet Protocol address is a loopback address.

19. The client computer as described in claim 17 further including means for redirecting a connection request associated with a stale IP address to a current IP address.

20. The client computer as described in claim 16 wherein the SOCKS proxy server includes means for filtering connection requests.

21. The client computer as described in claim 16 wherein the SOCKS proxy server includes means for monitoring Internet network activity.

22. A data processing system, comprising:

a remote control unit; and a base unit connectable to a monitor for providing Internet access under the control of the remote control unit, the base unit comprising:

a processor having an operating system;

a suite of Internet applications run by the operating system; and a SOCKS proxy server for intercepting and servicing connection requests on behalf of the Internet applications, the SOCKS proxy server servicing the connection requests by creating a dial-up connection between the client and the computer network, establishing an network address for the client, sending data from the application to the server, receiving information from the server sent to the network address and providing the information from the server to the application.

23. A method of managing connection requests from an Internet application supported on a client, the client connectable to at least one server via a computer network, the method comprising the steps of:

supporting a SOCKS server on the client;

configuring the application to send a connection request to the SOCKS server;

having the SOCKS server service the connection request locally;

monitoring an IP address resolution of a hostname connection serviced;

storing the IP address resolution with its associated hostname locally; and resolving subsequent requests to the hostname locally.

24. A client computer connectable to the Internet, comprising:

a processor having an operating system;

a suite of Internet applications run by the operating system;

a SOCKS proxy server for intercepting and servicing connection requests on behalf of the Internet applications, wherein the SOCKS proxy server monitors IP address resolutions of hostname connections, locally stores each hostname with its associated IP address resolution and resolves subsequent requests to locally stored hostnames using the locally stored associated IP address.

25. A data processing system, comprising:

a remote control unit; and a base unit connectable to a monitor for providing Internet access under the control of the remote control unit, the base unit comprising:

a processor having an operating system;

a suite of Internet applications run by the operating system;

a SOCKS proxy server for intercepting and servicing connection requests on behalf of the Internet applications, wherein the SOCKS proxy server monitors IP address resolutions of hostname connections, locally stores each hostname with its associated IP address resolution and resolves subsequent requests to locally stored hostnames using the locally stored associated IP address.

* * * * *